June 4, 1968 B. M. KAUFMAN 3,387,212

MOBILE RADIO PAGING SYSTEM WHEREIN THE RECEIVERS ARE ALL MADE OPERATIVE FOR A BRIEF INTERVAL FOLLOWING A TRANSMITTED TONE BURST

Filed June 9, 1964 5 Sheets-Sheet 1

INVENTOR.
BARRY M. KAUFMAN

BY Julian Caplan

ATTORNEY

INVENTOR
BARRY M. KAUFMAN
BY Julian Caplan
ATTORNEY

INVENTOR.
BARRY M. KAUFMAN
BY Julian Caplan
ATTORNEY

June 4, 1968 B. M. KAUFMAN 3,387,212
MOBILE RADIO PAGING SYSTEM WHEREIN THE RECEIVERS ARE
ALL MADE OPERATIVE FOR A BRIEF INTERVAL
FOLLOWING A TRANSMITTED TONE BURST
Filed June 9, 1964 5 Sheets-Sheet 4

INVENTOR.
BARRY M. KAUFMAN
BY Julian Caplan
ATTORNEY

June 4, 1968 B. M. KAUFMAN 3,387,212

MOBILE RADIO PAGING SYSTEM WHEREIN THE RECEIVERS ARE ALL MADE OPERATIVE FOR A BRIEF INTERVAL FOLLOWING A TRANSMITTED TONE BURST

Filed June 9, 1964 5 Sheets-Sheet 5

INVENTOR
BARRY M. KAUFMAN

BY Julian Caplan
ATTORNEY

United States Patent Office 3,387,212

Patented June 4, 1968

3,387,212

MOBILE RADIO PAGING SYSTEM WHEREIN THE RECEIVERS ARE ALL MADE OPERATIVE FOR A BRIEF INTERVAL FOLLOWING A TRANSMITTED TONE BURST

Barry M. Kaufman, Redwood City, Calif., assignor to Mu Western Electronics Co., Inc., Redwood City, Calif., a corporation of California Filed June 9, 1964, Ser. No. 373,667
25 Claims. (Cl. 325—1)

This invention relates to a new and improved mobile radio signalling system having numerous advantages over preexisting signalling systems now in use, as hereinafter set forth.

Because of the limited number of channels available for mobile communication and for reasons of economy, several users commonly share a single channel. Further, a single user may have several stations in operation, only one of which is interested in a given message. Disturbance of users and of stations other than the particular station to which the message is directed is a problem of considerable importance in this field. The present invention has as its principal object the reduction of such disturbance. This object is accomplished by maintaining loud speakers in the system muted until the proper signal is received. This feature of the invention also promotes privacy among users and among stations of one user.

A principal feature of the present invention is that the system separates channel use time into two distinct modes: "page" and "communicate." The "page" mode is indicated by a burst of audible signalling tone which activates all of a plurality of receiving loudspeakers in the system. A principal feature of this system is that while all operators equipped with appropriate tone receiving equipment hear the paged party called, all speakers then automatically revert to their original silent and muted condition, during which time the calling and called parties may communicate without disturbing other system users.

Still another feature of this invention is that a protected user may monitor his channel at any time by removing his microphone from its hook switch.

A still further feature of the present invention is the provision of an inhibiting circuit in all tone receivers such that the page tone is never broadcast through the operator's loudspeaker even though it is received by the tone receiver and activates the loudspeaker for vocal communications.

A further feature of this invention is that it is adaptable for use with either one-way or two-way signalling systems by simply omitting certain elements from the equipment.

A still further feature of the present invention is that it is adaptable for use in a system where more than one tone frequency is utilized to provide true individual call operation for certain key personnel in the system.

Another feature of this invention is that it is adaptable for use in a system providing tone protection for base stations only, in connection with manually keyed tone generators.

A still further feature of this system is that only nine leads need be connected to a mobile receiver-transmitter for two-way tone protected operation.

A further feature of the present invention is that page tone is generated automatically when the transmit push-button on the operator's microphone is depressed within a given time after tripping a page switch.

Another feature of this invention is the incorporation of an emitter follower transistor in a Schmitt trigger circuit.

A further feature of this invention is the provision of a controlled attack timing network to prevent sharp noise or voice transients from accidentally tripping the tone receiver.

A still further feature of the present invention is the incorporation of a common time delay circuit to keep the loudspeaker open for a pre-set interval while the calling party is paging the desired party and, in the calling party's receiver, to program his tone generator for a burst of page tone.

Another feature of this system is that it has a greater signal geographic range than systems now in use which utilize sub-audible signal tones.

A primary feature of the present invention is provision for quickly and easily changing system tone logic to a tone system to be utilized in connection with a repeater to increase effective transmission range.

A further feature of this invention is that it is easily adaptable to a repeater tone logic system which utilizes a communicate tone burst which precedes each transmission and is of shorter duration than a page tone burst.

A still further feature of this invention is the use of a tone protected repeater which repeats only those messages preceded by the appropriate tone frequency and which, by the use of a timing circuit, repeat only page tone bursts and not communicate tone pulses.

Another feature of the present system is that switching of tone generator tone burst times for a repeater logic system is accomplished simply by the use of the page and transmit buttons.

A primary feature of this invention is its easy adaptability for use with a multi-repeater system employing a plurality of repeater control tone frequencies, each associated with one repeater, and used with a single page tone frequency activating all mobile and base tone receivers.

A further feature of this system is the utilization of tone burst duration to program a repeater in a multi-repeater system for a communicate or page retransmission.

A still further feature of this invention is the provision for switching to page tone frequency pulse transmission in a repeater which responds only to its own control tone for retransmission.

Another feature of the present invention is the incorporation of a filter circuit to prevent retransmission of repeater control tone frequency.

Other objects of the present invention will become apparent upon reading the following specification and referring to the accompanying drawings in which similar characters of reference represent corresponding parts in each of the several figures.

*The paging concept*

The degree of operator annoyance and fatigue in a communication system is a function of the amount of subjection to extraneous information that the operator receives over his loudspeaker, and this is related to the amount and type of information coming over the operator's loudspeaker.

Paging is now an accepted method of attracting an individual's attention over communication means. The occasional announcement of a person's name or code number over the paging system creates only a negligible amount of annoyance and distraction to those not immediately concerned. The present invention operates on the principle of breaking up channel use time into two distinct modes: page and communicate.

During the page interval, appropriate systems are open and unmuted, at which time the calling party pages the desired unit or party. After completion of paging, all speakers automatically revert to their pre-page silent and muted condition. The called party manually switches on channel by removing his microphone from its hook, or in some installations by throwing a switch. His acknowledgment to the caller and any further communications between them will be inaudible to other parties on the system. Protection of base stations as well as mobile units is easily achieved with this technique.

*Signalling systems*

Figure 1:
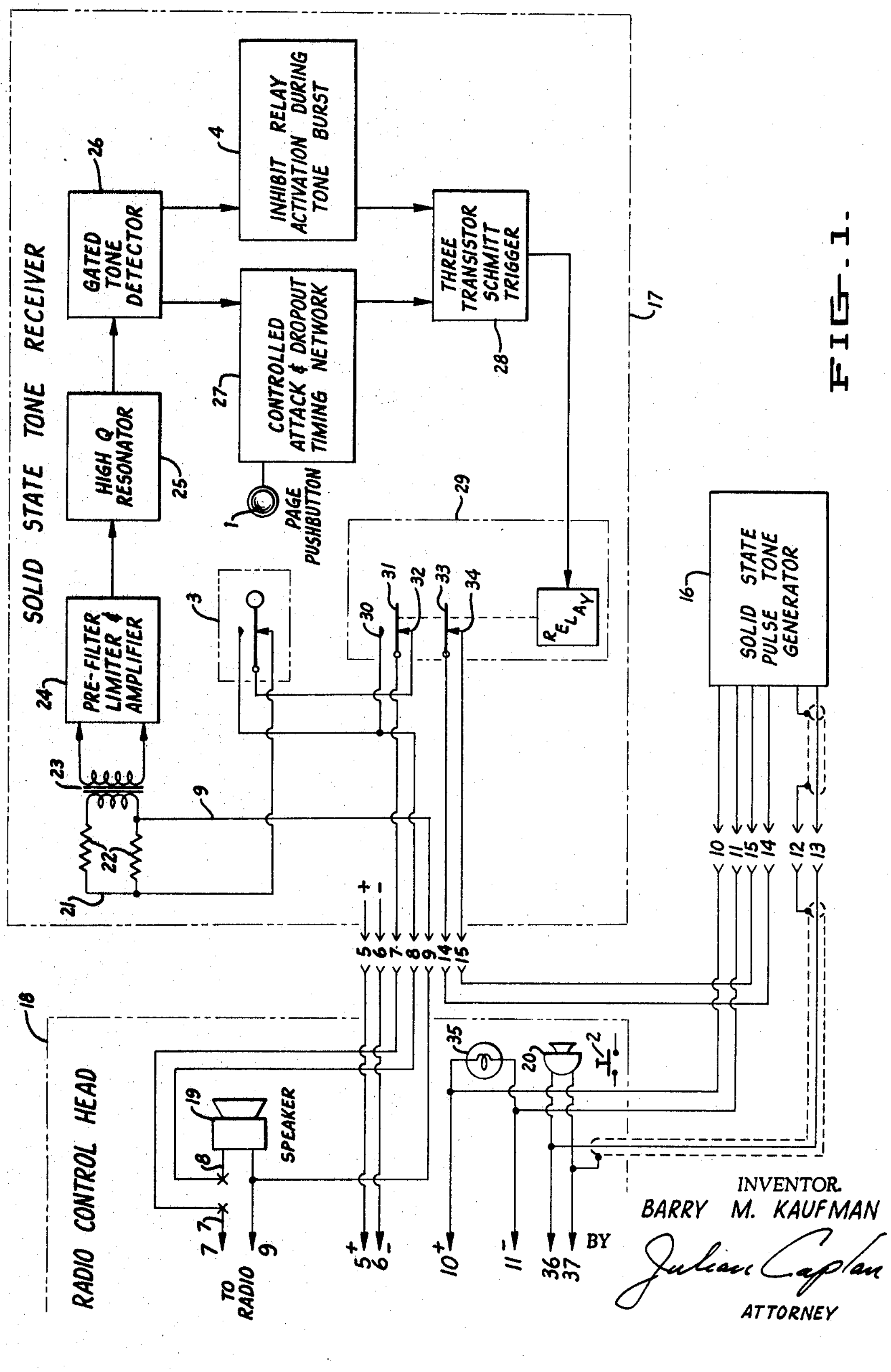
FIG. 1 is a schematic block diagram of a tone receiver and generator connected to a radio and illustrates the function and operation of a system embodying the present invention.

In a two-way signalling system all base stations and mobile units are equipped with tone transmitting and receiving equipment. Referring to FIG. 1, this equipment includes a push button labelled "page" 1; a second push button labelled "transmit" 2. Mobile tone receivers are equipped with a microphone hook switch 3. Base stations may employ a hand-operated switch in lieu of the hook switch. Taking the microphone off hook or activating the switch at the base station by-passes tone receiver protection and enables the operator to monitor all communications on his channel.

In such a system, if a mobile operator wishes to communicate with someone in his system, he first comes off hook, tripping hook switch 3. He now is able to monitor all communications on his channel. Next, he pushes his page button 1. Operation of page button 1, automatically triggers a 6-second timer circuit and readies the tone-transmitting portion of his signalling equipment. If transmit push to talk button 2 is depressed within approximately 5 seconds after releasing page button 1, a 1.3 second burst of tone will be transmitted to all receivers. All loudspeakers in the system will be unmuted and activated for 6 seconds, beginning at the trailing edge of the tone burst. The mobile operator then has approximately 6 seconds to call his party. The person to whom the call was directed comes off hook, thereby by-passing tone receiver operation, and normal communications ensue. This communication will not be heard by others in the system as no tone is then transmitted. Since the basic logic of tone protected base station equipment is identical to that of mobile equipment, the above described procedure applies to protected base stations as well.

An essential feature of the above described logic system is that operators at tone protected stations or units do not hear the page tone. An inhibiting circuit 4 prevents tone receiver relay operation until the end of the tone burst interval.

True individual call operation for certain key units or personnel in the system is achieved by equipping the dispatcher's tone transmitter with more than one tone frequency. As an example, administrative personnel and maintenance crews working through a common dispatcher on a single channel, are assigned different tone frequencies. Only the party on each tone frequency hears a call made with that frequency tone burst.

Special applications arise where it is necessary that dispatcher or mobile tone receivers or generators be switchable to a plurality of tone frequencies. Selection of a number of tone frequencies is possible via rotary or push button switches. Strapping inside the tone generator's or receiver's case may be used in lieu of a multi-frequency switch.

Another variation is the protection of base stations only. Each mobile unit is equipped with a tone generator which is of the keyed tone rather than the pulse tone type. Base stations and mobile units are designed to supply channel monitoring via a three-position switch rather than employing a hook switch. Mobile units may communicate without disturbing tone protected base station operators. If a mobile unit wishes to contact a base, he pushes his page button for a period of about one to two seconds. This simultaneously programs his transmitter and modulates his transmitter with tone. He then has approximately six seconds to call the desired base station. Six seconds after the trailing edge of his tone, all base station loudspeakers remute.

*A mobile two-way signalling installation*

FIG. 1 is a block diagram of a two-way mobile signalling installation utilizing system logic hereinbefore described. Only nine leads: 5, 6, 7, 8, 9, 10, 11, 12 and 13, need be connected from the tone equipment 16 and 17, to the radio or radio control head 18. The connection between receiver output 7 and lead 8 to speaker 19 is broken and the two leads 7 and 8 are diverted through tone receiver system 17. Taking microphone 20 off hook switch 3 reconnects leads 7 and 8, thereby connecting the radio to loudspeaker 19. This enables the operator to listen to and monitor all information on the channel. When microphone 20 is on hook switch 3, radio output 7 is connected to tone receiver input lead 21. Radio receiver signals pass through load 22 and are stepped up through isolation transformer 23. Radio signals are then applied to prefilter limiter and amplifier 24, which comprises a symmetrical diode clipper driving a degenerative constant current solid state amplifier. This amplifier drives high Q resonator 25, which comprises a high Q potcore and polystyrene capacitor resonator. This drives solid state gated tone detector 26. This drives controlled attack and dropout timing network 27 and three transistor Schmitt trigger 28, which in turn activates relay 29. Gated detector 26 also drives inhibiting circuit 4 which prevents relay activation until tone burst has ceased, thereby protecting the operator from annoyance and distraction which would be caused if the tone burst were heard over his loudspeaker 19.

When the page tone ceases, relay 29 is activated and Schmitt trigger timing circuit 28 will maintain relay 29 energized for approximately 6 seconds. When the coil of relay 29 is energized, normally closed contacts 31 and 32 will open and normally open contacts 31 and 30 will close, switching radio receiver output from tone receiver input 21 to loudspeaker input 8. After the 6-seconds' paging interval, relay 29 is de-energized and speaker 19 remutes.

To make a call, the operator comes off hook 3 to allow monitoring of channel as described. The operator then pushes page button 1, which activates Schmitt trigger 28 and energizes relay 29 for approximately 6 seconds. During this interval, normally closed contacts 33 and 34 of relay 29 will open, programming solid state pulse tone generator 16 through leads 14 and 15 for page tone transmission burst. Page tone will be generated if transmit key push button 2 is pushed within approximately five seconds. Indicator light 35 is lit when transmit key button 2 is held in during transmission and this keyed DC power supply is carried to pulse tone generator 16 through leads 10 and 11.

DC power supply for tone receiver 17 is carried over leads 5 and 6. Pulse tone output is carried to microphone 20 output leads 36 and 37 over co-axial cable leads 12 and 13 coming out of pulse tone generator 16.

*Mobile tone receiver and generator circuit*

Figure 2:
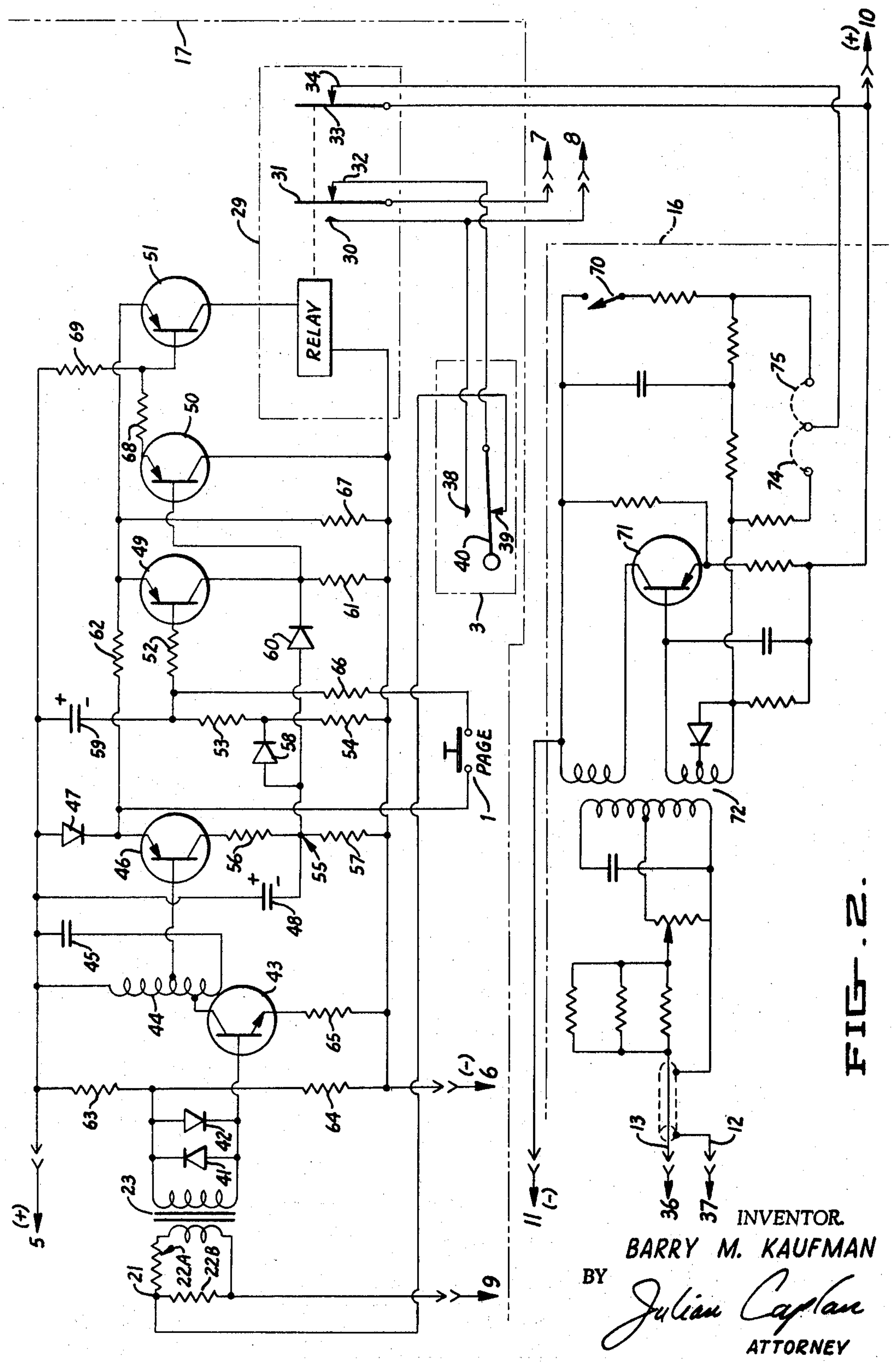
FIG. 2 is a diagram of a tone receiver and generator circuit embodying the present invention.

FIG. 2 is a schematic circuit diagram of a mobile tone signalling receiver and tone generator. Although tone receiver 17 and tone generator 16 are shown interconnected, it is evident that tone generator 16 can be disregarded if only a one-way signalling installation of the type previously described is desired.

Output from the radio receiver is connected across leads 7 and 9. Lead 8 connects to one side of loudspeaker 19 as shown in FIG. 1. DC power for tone receiver 17 is carried on leads 5 and 6. The circuit of tone receiver 17 is designed to operate on a nominal 12 v. DC power source. Keyed 6 or 12 v. DC voltage from the radio transmitter is connected across leads 10 and 11. Tone output from pulse tone generator 16 is carried over coaxial cable leads 12 and 13 to radio transmitter inputs 36 and 37.

Radio receiver signal input through lead 7 is connected to tone receiver input 21 through normally closed contacts 31 and 32 of relay 29 and through contacts 39 and 40 of microphone hook switch 3, which are closed when the microphone is on hook. Resistors 22 form a load and impedance matching circuit prior to isolation transformer 23. Diodes 41 and 42 symmetrically clip all signals to a constant amplitude. Transistor 43 amplifies the signal and drives inductance 44 and capacitor 45, which comprise a frequency selecting resonator circuit tuned to the tone signal frequency. Detector stage transistor 46 in the absence of page tone frequency, is normally cut off due to emitter cutoff bias voltage across forward conducting diode 47. When proper tone frequency is received, tone resonator circuit composed of 44 and 45, will allow an output signal to pass, sufficient to allow negative halves of the tone cycle to cause transistor 46 to conduct. Large pulses of collector current through 46 will discharge smoothing capacitor 48.

Before page tone is received, normal condition of the circuit is as follows: transistor 46 is cut off; transistor 51 is cut off; transistor 50 is essentially cut off; and transistor 49 is fully conducting due to base current flowing through resistors 52, 53 and 54. Transistors 49, 50 and 51 form a modified Schmitt trigger circuit. Transistor 50 is an emitter follower placed between the first and second transistor of a conventional Schmitt trigger circuit. This adaptation greatly reduces the base current required in transistor 49 for maintaining transistor 51 in the cut-off state.

Reception of page tone causes transistor 46 to conduct, thereby causing a resultant positive swing of the voltage at point 55 at the junction of resistors 56 and 57. Diode 58 allows this positive swing to discharge capacitor 59 through resistor 53. The discharge of capacitor 59 causes transistor 49 to cut off. This would normally cause the voltage of the collector of 49 to rise closer to negative line voltage, which would thereby cause 51 to conduct, since emitter follower 50 would follow the voltage of the collector of transistor 49. However, this does not occur, since the conduction of transistor 46 will maintain the collector of 49 near positive line voltage due to the conduction of inhibiting diode 60.

When transistor 46 conducts, capacitor 59 does not discharge instantly since the combination of capacitor 59 and resistor 53 forms a time-delay discharging circuit. This arrangement prevents sharp noise of short duration or voice transients from accidentally tripping the tone sensitive circuit. When tone ceases at input 21 of the tone receiver 17, transistor 46 will cut off, releasing its hold on diodes 58 and 60. This leaves capacitor 59 in the discharged state. Since transistor 49 is cut off, the collector of 49 is pulled toward negative line voltage by resistor 61, causing transistor 50 to conduct and thereby causing transistor 51 to conduct. When transistor 51 conducts, relay 29 becomes energized.

Energization of relay 29 causes contacts 31 and 32 to break, thereby removing radio receiver output from tone receiver input; and contacts 30 and 31 to make, thereby connecting radio receiver output in lead 7 to loudspeaker through lead 8. Conduction of 51 causes a large voltage to be developed across emitter resistor 62. Resistor 54 will slowly charge capacitor 59 since they form a time-delay charging circuit. After the page interval, the potential across capacitor 59 will be sufficiently negative to cause transistor 49 to conduct. The resultant slight voltage drop across resistor 61 will cause slightly less current to flow through transistor 51 with a resultant reduction in the voltage across resistor 62. This reduction in voltage across 62 will aid conduction in transistor 49. This is a positive feedback reaction and will continue until the base of transistor 49 has discharged capacitor 59 through resistor 52 sufficiently to cutoff conduction of transistor 51. When transistor 51 has been cutoff, relay 29 will de-energize, bringing the circuit back to standby condition. The above described feedback discharging action of capacitor 59 is relatively rapid with respect to the much longer page interval caused by the time-delay action of resistor 54 in series with capacitor 59. Resistors 63 through 69 perform standard loading and bias functions that are well known in the art.

The operator may at any time bring his microphone off hook, causing contacts 38 and 40 in hook switch 3 to connect radio output to loudspeaker, effectively connecting leads 7 and 8. This allows the mobile operator to monitor his channel prior to calling.

Page push button 1 is incorporated when two-way signalling is desired. When button 1 is depressed, capacitor 59 is discharged, causing the Schmitt trigger circuit to energize relay 29, as hereinbefore described. When button 1 is released, relay 29 will remain energized for the page interval, approximately 6 seconds, allowing the operator to push his transmit key push button and page the desired party.

In a two-way signalling system, mobile tone generator 16 is also utilized. Tone generator 16 puts out a burst or pulse of the appropriate tone frequency each time the associated radio transmitter is keyed and system logic dictates that tone is to be transmitted. Leads 10 and 11 bring in the keyed transmitter power. Switch 70 is normally open and is closed only to transmit a continuous tone for maintenance tuning and adjustment. Tone transmitter 16 comprises a tuned *L/C* oscillator which is a variation of well known standard oscillator circuits and utilizes transistor 71. The collector signal of transistor 71 is fed back through inductance transformer 72 in phase with the base signal to sustain oscillation until quenched. The frequency of the tone generated is determined by the value of the various circuit elements.

The position of jumpers 74 and 75 selects the type of tone logic to be utilized. For normal operation as above described, jumper 75 is removed and jumper 74 is connected. In this condition, if relay 29 is de-energized, tone generator 16 will not modulate radio transmission with tone when the transmitter is keyed by the transmit key push button 2. If the page button has been pressed, energizing relay 29, relay contacts 33 and 34 open up, allowing tone generator 16 to send out approximately 1.3 seconds of tone when the transmitter is keyed.

If the apparatus is to be used in connection with a radio repeater station, tone logic must be changed to provide a nominal 0.25 second burst each time the transmitter is keyed. This logic system is described in greater detail subsequently. Jumper 74 is removed and jumper 75 is inserted. When relay 29 is de-energized, tone generator 16 will put out a nominal .25 second burst each time the radio transmitter is keyed. When relay 29 is energized, contacts 33 and 34 open, allowing tone generator 16 to put out a 1.3 second burst of tone when the radio transmitter is keyed.

*Communications through a repeater*

Effective signalling range can be greatly increased by the use of a repeater station placed near the outermost limit of a base station's range. The repeater station amplifies and repeats all voice and tone information from the base station to a mobile unit and vice-versa for a two-way system.

A superior form of repeater is a tone protected repeater, which repeats only that information preceded by the appropriate tone frequency. Tone protected repeaters are required presently by the Federal Communications Commission to cut down on the amount of information being broadcast and to decrease crowding of channels.

The basic signalling system previously described can be modified to perform with tone protected repeaters by a few easily achieved tone logic changes. Page mode signalling from dispatches or mobile units will still require the transmission of a 1.3 second burst of tone, but all communicate transmissions will begin with a 0.25 second burst of tone. In two-way signalling systems, both tone modes are initiated by keying the transmitter.

For one-way signalling systems, the dispatcher's tone generator will transmit a 0.25 second bust when the transmit key button 2 is depressed and a 1.3 second burst when page button 1 is pushed. For protection of base stations only with keyed page activators, mobile tone generators will transmit a 0.25 second tone burst at the beginning of each transmission and tone will be transmitted for the duration that the page key is activated by a momentary push button switch. For a two-way signalling system as described in connection with FIGS. 1 and 2, all communicate transmissions will begin with an 0.25 second tone burst. Activation of the page button 1 will trigger the tone receiver's 6-second timing circuit which will program tone generator 16 for a 1.3 second burst. A page transmission made during the 6-second page interval will begin with a 1.3 second burst of tone as previously described. The change-over of tone generator 16 from regular to repeater tone logic is accomplished by the use of jumpers 74 and 75, as hereinbefore described. The essential feature is that the switching of tone burst times is accomplished with the repeater logic system simply by pushing the page button.

Figure 3:
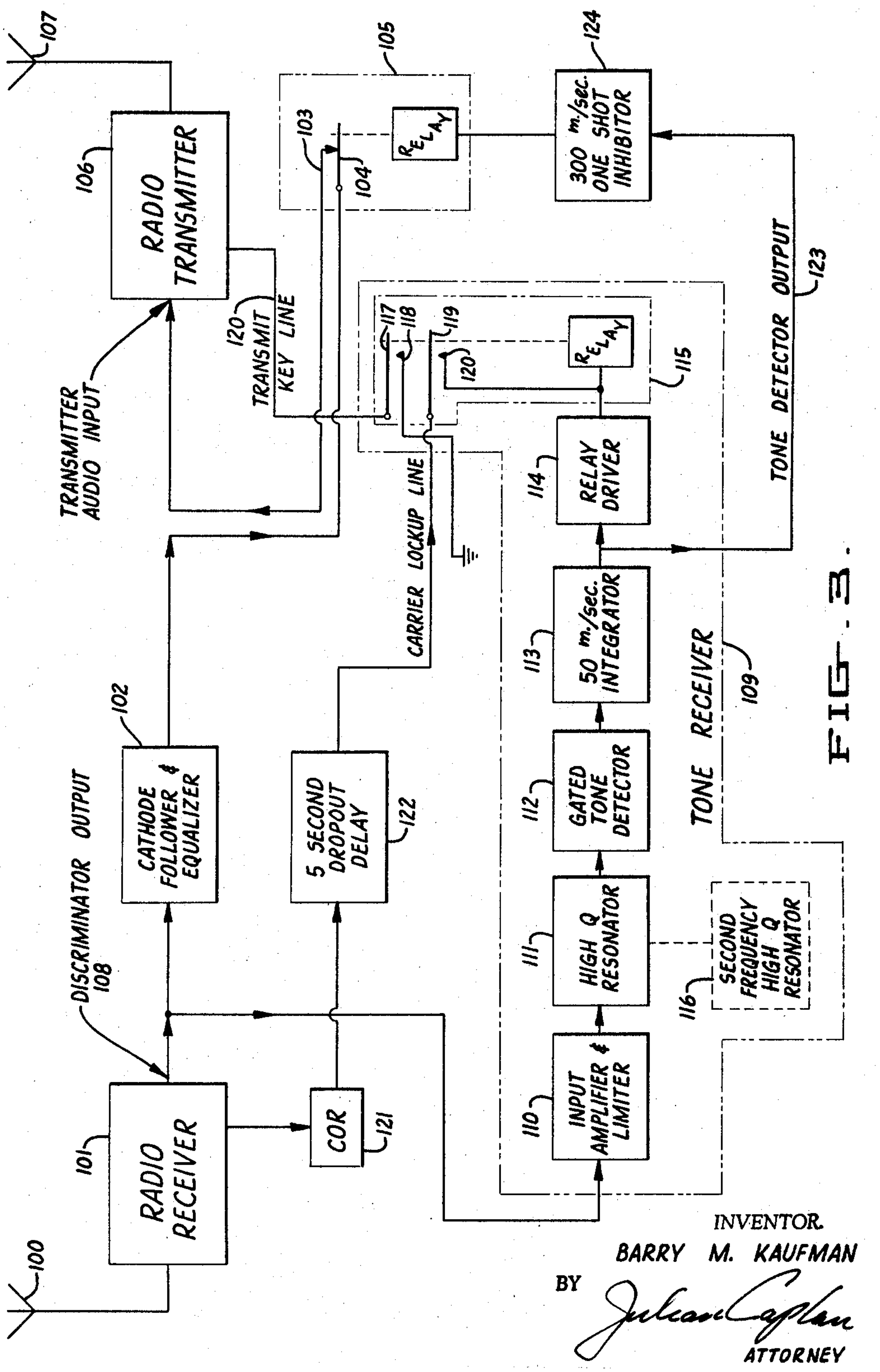
FIG. 3 is a schematic block diagram of a repeater installation embodying the present invention.

FIG. 3 is a block diagram of a repeater installation. Radio signals from a base station or mobile transmitter unit are received at antenna 100 and fed into radio receiver 101. Received signals are fed into cathode follower and equalizer 102 and then through contacts 103 and 104 of relay 105 to radio transmitter 106. Transmitter 106 amplifies the weak signal received at antenna 100 and retransmits it through transmission antenna 107. Receiver discriminator output 108 is fed to tone receiver 109. Tone receiver 109 comprises: input amplifier and limiter 110, which is similar in operation to element 24 in FIG. 1; high Q resonator 111, similar to element 25; gated tone detector 112, similar to element 26; 50 milli-second integrator 113; relay DC amplifier driver 114; relay 115; and a second frequency high Q resonator 116 may be added to allow tone receiver 109 to respond to either of two tone frequencies. Integrator 113 operates to prevent energization of relay 115 unless more than 50 milli-seconds of tone signal is received. This time value was chosen as a compromise between rejection of short duration noise and voice transients as compared with reliable response to the shortest anticipated received tone bursts.

When the proper tone is received, relay 115 will be energized, closing normally open contacts 117 and 118, thereby keying transmitter 106 for transmission by connecting transmit key line 120 to ground. Relay 115 will remain energized by lockup voltage fed from Carrier operated relay 121 through relay contacts 119 and 120. C.O.R. 121 will remain energized as long as a carrier signal is received by receiver 101 and therefore relay 115 will keep radio transmitter 106 keyed as long as a message is received, once the proper tone has initially energized relay 115. Five second dropout delay relay 122 will keep relay 115 energized and transmitter 106 keyed for five seconds after carrier signal has ceased, to allow the calling party to page.

After tone is received and transmitter 106 is keyed, 50 milli-second integrator output 123 is fed to 300 millisecond one shot inhibitor 124. Inhibitor 124 activates relay 105 which inhibits repeated transmission of all audio (both speech and tone) until the end of the 350 milli-second interval (50 msec.) plus 300 msec.) following the initial reception of a tone burst. The result is that received tone bursts of 0.25 second (250 msec.) associated with communicate transmission are *not* repeated by the repeater. Further, all but the first 0.35 second (350 msec.) of the 1.3 second page tone will be retransmitted by the repeater, which will be of sufficient duration to activate base station and mobile tone receivers.

Thus, the repeater described will retransmit only the page tone and those speech communications which are preceded by the proper frequency tone burst. All other communications on that channel will not be repeated and will therefore not interfere with other persons utilizing that channel within the transmitting range of the repeater.

*A multi-repeater system*

Applications arise, for instance in mountainous areas, where a plurality of repeaters is employed to extend the coverage area. All repeaters are within communication range of the dispatchers. Undesirable interference would result if more than one repeater were operated at a time. Therefore, dispatchers and mobile operators are provided means to select only the desired repeater. For example, consider a system utilizing five repeater stations, designated repeaters A, B, C, D, and E. All dispatchers and mobile units are equipped with tone receivers operated on a common page tone frequency P, which is different from the control frequency for each of the repeaters.

Figure 4:
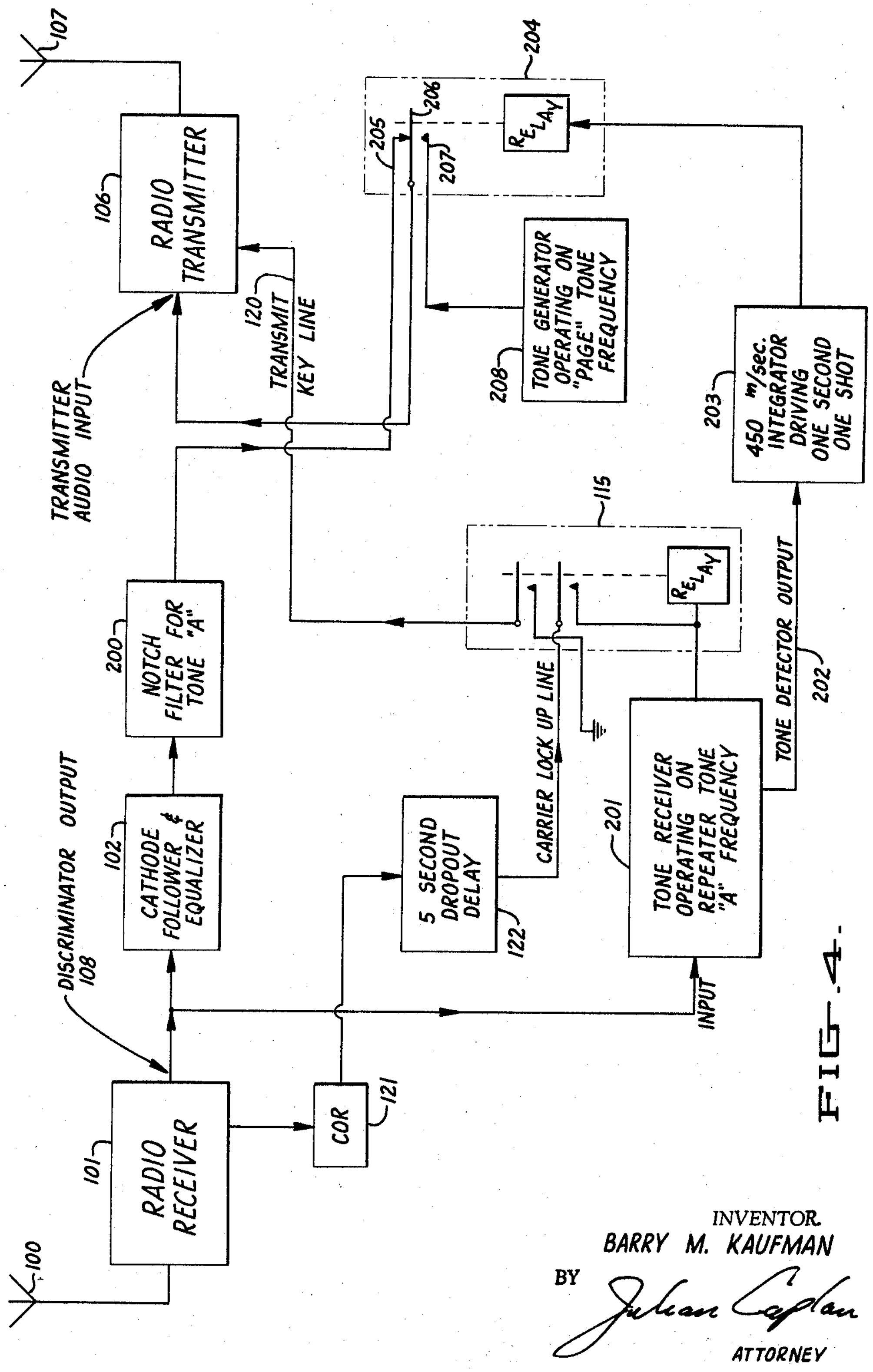
FIG. 4 is a schematic block diagram of a multi-repeater installation embodying the present invention.

FIG. 4 shows a multi-repeater system designated A, with many of the components being identical to those elements having the same number in FIG. 3. The following changes have been made from FIG. 3: notch filter for tone A, 200, is connected in the audio path between cathode follower 102 and transmitter 106, to reject repeater control tone A. Thus, the control tone is not heard by the operator since it is cut out of the repeater's audio path. Relay 115, and therefore transmitter 106, will be activated if carrier signal and at least 50 milli-seconds of tone frequency A are received by tone receiver 201 which is tuned to tone frequency A for this repeater. Output 202 from 50 milli-second integrator 113 within tone receiver 201, drives 450 milli-second integrator and one second one shot circuit 203. If duration of received tone A is less than 500 milli-seconds (50 msec. plus 450 msec.) then one second one shot circuit 203 is never triggered. This condition occurs for communicate transmissions which utilize a 0.25 sec. tone burst. A page transmission of a 1.3 sec. tone burst will fire the one shot circuit 203, causing relay 204 to be energized for one second. Prior to this time, all received signals preceded by tone A (with the exception of tone A) were connected through normally closed contacts 205 and 206 of relay 204 to transmitter 106. One second energization of relay 204 opens contacts 205 and 206 and closes contacts 206 and 207, transferring audio input to tone generator operating on P page tone frequency 208. This one second burst of P frequency page tone will trigger and unmute all loudspeakers within range of the repeater transmitter 106, since all receivers in the system operate on P frequency and all repeaters in the system generate P frequency.

All base stations and mobile units are equipped with frequency selecting switches as has been described previously. The frequency of tone generated by the calling party (e.g. tone A, B, etc.) determines which repeater station will retransmit the message. Duration of the repeater control tone will indicate to the repeater whether the transmission is for page or communicate mode.

Figure 5:
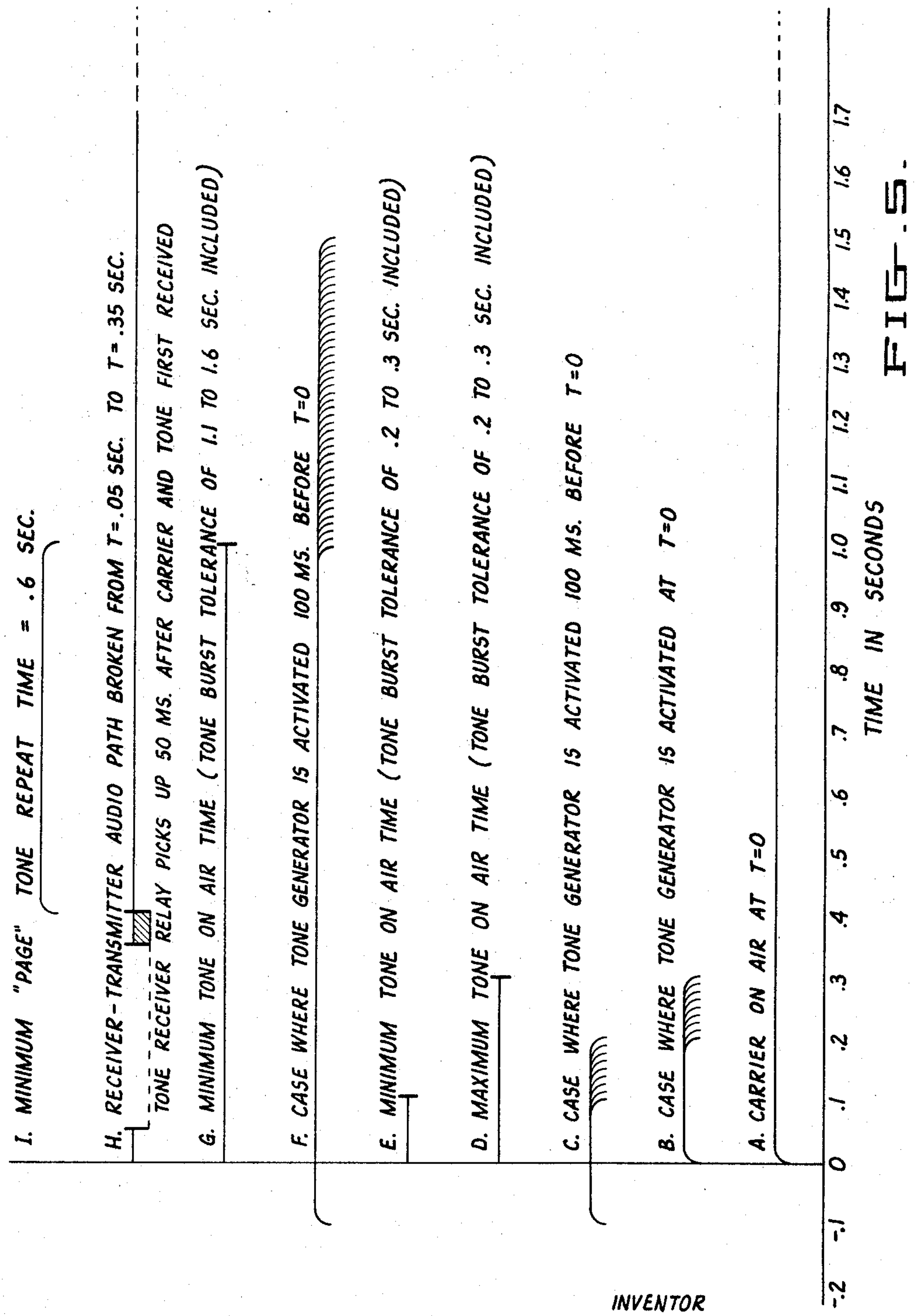
FIG. 5 is a timing chart showing typical time sequences in a system embodying the present invention.

Referring to FIG. 5, shaded areas designate timing tolerances of tone signaling equipment described above. Time equals 0 is defined as the time that carrier signal is first transmitted. Lines C and F illustrate the condition where there is a delay between activating the transmit button and commencement of carrier transmission, and therefore tone generator may be activated before carrier signal goes on the air. Lines B, C, D and E show repeater control tones transmitted from any station. Lines F and G show page tones transmitted. Lines H and I show timing and retransmit sequences of a repeater station.

The following is a chart showing representative values for the electrical components described above and shown in the circuit of FIG. 2:

| Component | Unit | Value |
|---|---|---|
| 22A | ohms | 27 |
| 22B | do | 10 |
| 45 | microfarads | 0.10 |
| 48 | do | 10.0 |
| 52 | ohms | 3.9K |
| 53 | | [1] |
| 54 | | [2] |
| 56 | ohms | 18 |
| 57 | do | 12K |
| 59 | microfarads | 200 |
| 61 | ohms | 8.2K |
| 62 | do | 100 |
| 63 | do | 4.7K |
| 64 | do | 1.2 |
| 65 | do | 1.0 |
| 66 | do | 47 |
| 67 | do | 680 |
| 68 | do | 680 |
| 69 | do | 3.9K |

[1] Selected for desired attack time.
[2] Selected for desired Schmitt trigger drop-out time.

Although the foregoing invention has been described in some detail, by way of illustration and example for purposes of clarity of understanding it is understood that certain changes and modifications may be practiced within the spirit of the invention and scope of the appended claims.

What is claimed is:

1. A system for paging a certain station in a radio communications system comprising,
   - tone generator means to produce an audible tone,
   - a manual paging switch to program actuation of said tone generator means,
   - a first timing circuit triggered by said paging switch to program said tone generator means for actuation during a first timing interval,
   - radio transmission means to transmit said tone and other communications,
   - a manual transmit switch to actuate said tone generator means when said transmit switch is operated during said first timing interval, and to energize said radio transmission means,
   - radio receiver means,
   - speaker means receiving the audio output of said radio receiver means, when activated, said speaker means being normally in a silent state,
   - speaker activation means receiving the audio output of said radio receiver means to activate said speaker means for a second timing interval upon reception of said tone, and
   - a manual speaker switch to activate said speaker means.

2. A system according to claim 1 in which said speaker activation means comprises,
   - tone receiver means receiving the audio output of said radio receiver means,
   - a second timing circuit actuated by reception of said tone in said tone receiver means,
   - switching means to activate said speaker means by connecting said speaker means to the audio output of said radio receiver means for the duration of said second timing interval.

3. A system according to claim 1 in which said speaker activation means comprises,
   - tone receiver means receiving the audio output of said radio receiver means,
   - and in which said first timing circuit is actuated by reception of said tone in said tone receiver means, and which further comprises
     - switching means to activate said speaker means by connecting said speaker means to the audio output of said radio receiver means for the duration of said first timing interval.

4. A system according to claim 2 in which said first timing circuit and said second timing circuit each comprises a Schmitt trigger circuit having a first and second transistor, and an emitter follower transistor electrically positioned between said first transistor and said second transistor of said Schmitt trigger circuit.

5. A system according to claim 2 in which operation of said manual transmit switch during said first timing interval causes said page tone generator to produce a tone burst of a first duration and in which operation of said manual transmit switch other than during said first timing interval causes said tone generator to produce a tone pulse of a second duration, said first duration being longer than said second duration.

6. A system according to claim 1, which further comprises inhibiting circuit means to prevent said tone received by said radio receiver means from being broadcast by said speaker means.

7. A system according to claim 6, in which said inhibiting circuit means comprises a first transistor to conduct when said tone frequency is received by said tone receiver means, a second transistor to cut off when said first transistor conducts, a third transistor to conduct upon reenergization of said second transistor, conduction of said third transistor causing actuation of said speaker means only after reception and termination of reception of said tone frequency.

8. A system according to claim 1, which further comprises a plurality of additional stations, each composed of radio transmission means, radio receiver means, speaker means, speaker activation means, manual speaker switch, and a manual transmit switch, directly controlling actuation of said tone generator means.

9. A system according to claim 1, which further comprises
   - a sending station including said tone generator means, said manual paging switch, said first timing circuit, said radio transmission means and said manual transmit switch,
   - and a receiving station including said radio receiver means, said speaker means, said speaker activation means and said manual speaker switch.

10. A system according to claim 1 in which said tone generator means comprises
    - means to generate a plurality of given tone frequencies, and
    - manual selector means to select the desired tone frequency to be generated and transmitted.

11. A system according to claim 10 which further comprises a plurality of receiving stations, said speaker activation means of each of said stations actuated by only that tone frequency assigned to that station.

12. A system according to claim 11 in which operation of said manual paging switch causes said tone generator to produce a tone pulse of a first duration, and in which operation of said manual transmit switch causes said tone generator to produce a tone pulse of a second duration, said first duration being longer than said second duration.

13. A system according to claim 10 which further comprises a plurality of repeater stations, repeater activation means in each said repeater station, said repeater activation means of each of said repeater stations being actuated by only that repeater tone frequency assigned to that station.

14. A system according to claim 1 which further comprises a third timing circuit triggered by said transmit switch to time the duration of a pulse generated by said tone generator means for a third timing interval.

15. A system according to claim 1 which further comprises a radio repeater station to receive, amplify and retransmit signals transmitted by said radio transmission means, repeater activation means receiving the audio output of said repeater station to activate a re-transmitter in said repeater only when received signals are preceded by a tone pulse of the proper frequency.

16. A system according to claim 15 which further comprises a plurality of radio repeater stations, said repeater activation means of each of said stations being actuated by only that tone frequency assigned to that repeater station.

17. A system for paging a certain station in a radio communications system through a repeater, said system comprising, a calling station, audio tone generator means in said calling station, radio transmission means in said calling station to transmit said tone and other communications, said calling station transmitting a page tone pulse to actuate receiver speakers and transmitting a communicate tone pulse at the initiation of each communication, said page tone pulse being of greater duration than said communicate tone pulse, a repeater station remote from said calling station, activation means in said repeater station to cause said repeater station to re-transmit signals only when said signals are preceded by a tone pulse, tone inhibitor means in said repeater station to prevent said repeater station from repeating and retransmitting for a fixed timing duration at the commencement of each retransmission, said fixed timing duration being greater than the duration of said communicate tone pulse and less than the duration of said page tone pulse, to prevent retransmission of said communicate tone pulses and permit retransmission of a portion of said page tone pulses sufficient to activate receiver speakers.

18. A system for paging a certain station in a radio communications system through a repeater, said system comprising, a calling station, audio tone generator means in said calling station, radio transmission means in said calling station to transmit said tone and other communications, said calling station transmitting a page tone pulse to actuate receiver speakers and transmitting a communicate tone pulse at the initiation of each communication, said page tone pulse being of greater duration than said communicate tone pulse, said page tone pulse and said communicate tone pulse being of substantially a same first frequency, a repeater station remote from said calling station, activation means in said repeater station to cause said repeater station to retransmit signals only when said signals are preceded by a tone pulse of said first frequency, a receiving station, speaker means within said receiving station, said speaker means receiving signals transmitted by said repeater station when said speaker means are activated, speaker activation means within said receiving station, said speaker activation means being operated upon reception by said receiving station of a page tone pulse of a second frequency differing substantially from said first frequency, second frequency tone generator means within said repeater station to generate a page tone pulse of said second frequency, tone activator means within said repeater station to activate said second frequency tone generator means only when said repeater station receives a page tone pulse of said first frequency and not when a communicate tone pulse of said first frequency is received, and radio transmission means in said repeater station to transmit said page tone pulse of said second frequency to activate said speaker means.

19. A system according to claim 18 which further comprises notch filter circuit means to prevent said repeater station from re-transmitting said first frequency tone pulses.

20. A system according to claim 18 which further comprises a plurality of radio repeater stations, said tone activator means of each of said stations being actuated by only that tone frequency assigned to that repeater station.

21. A system according to claim 18 in which said tone activator means comprises a timing circuit triggered by reception of a page tone pulse of said first frequency, connecting means to connect said second frequency tone generator means to said radio transmission means of said repeater station for a paging pulse of a duration controlled by said timing circuit.

22. A method for paging a certain station in a radio communications system comprising, generating a pulse of audio tone from an oscillator source, transmitting said tone pulse by a radio transmitter in a calling station, receiving said tone pulse in a plurality of receiving stations to activate speaker means in each said receiving station for a pre-set paging interval after reception of said tone pulse, paging the desired receiving station by transmitting a call to all receiving stations during the paging interval, manually activating speaker means at the called station after the paging interval, and acknowledging the call and communicating with the calling station.

23. A system for paging a certain station in a radio communications system comprising, tone generator means to produce an audible tone, a manual paging switch to actuate said tone generator means to produce a tone pulse, radio transmission means to transmit said tone pulse and other communications, radio receiver means, speaker means receiving the audio output of said radio receiver means, said speaker means being normally in a silent state, and speaker activation means receiving the audio output of said radio receiver means to activate said speaker means for a timing interval of a given duration upon reception of said tone pulse, and a timing circuit activated by reception of said tone pulse to operate through said speaker activation means to maintain said speaker means operative during said timing interval.

24. A method for paging a certain station in a radio communications repeater system comprising, generating a first pulse of audio tone of a first duration from an oscillator source, transmitting said first tone pulse by a radio transmitter in a calling station, receiving said first tone pulse in a radio repeater station, repeating and retransmitting a substantial portion of said first tone pulse in said radio repeater station, receiving said first tone pulse repeated by said radio repeater station in a plurality of receiving stations to activate speaker means in each said receiving station for a pre-set paging interval after reception of said repeated first tone pulse, paging the desired receiving station through said repeater station during the paging interval, manually activating speaker means at the called receiver station after the paging interval, acknowledging the call and communicating with the calling station through said radio repeater station by transmitting at the commencement of each communication a second tone pulse of a second duration shorter than said first tone pulse duration, and repeating only said communication and not said second tone pulse in said radio repeater station.

25. A method according to claim 24 in which said first and second tone pulse generated by said calling station are of a substantially different frequency than said first tone pulse transmitted by said radio repeater station.

References Cited

UNITED STATES PATENTS

| | | | |
|---|---|---|---|
| 2,671,167 | 3/1954 | Kulansky | 325—55 |
| 2,734,131 | 2/1956 | Magnuski | 325—1 X |
| 2,974,221 | 3/1961 | Peth | 340—312 X |
| 2,980,794 | 4/1961 | Hargreaves et al. | 325—64 |
| 3,161,728 | 12/1964 | Rose et al. | 325—55 X |
| 3,209,258 | 9/1965 | Collins et al. | 325—3 |

ROBERT L. GRIFFIN, *Primary Examiner.*

DAVID G. REDINBAUGH, *Examiner.*

B. V. SAFOUREK, *Assistant Examiner.*